W. E. FOLTZ.
VALVE STEM LUBRICATOR AND PACKING.
APPLICATION FILED JULY 23, 1909.
940,143.
Patented Nov. 16, 1909.
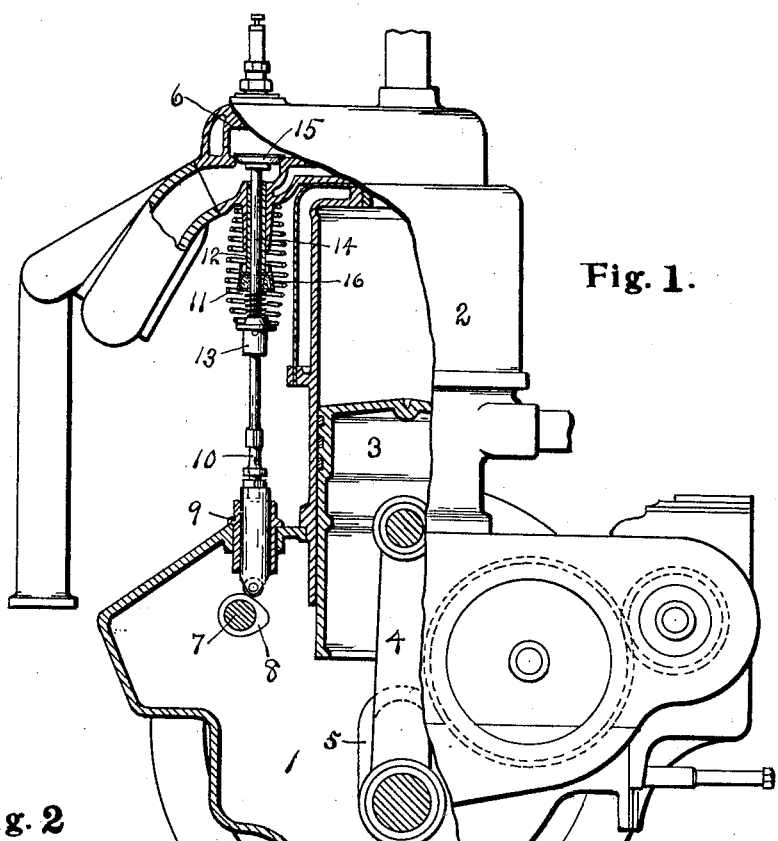
Fig. 1.
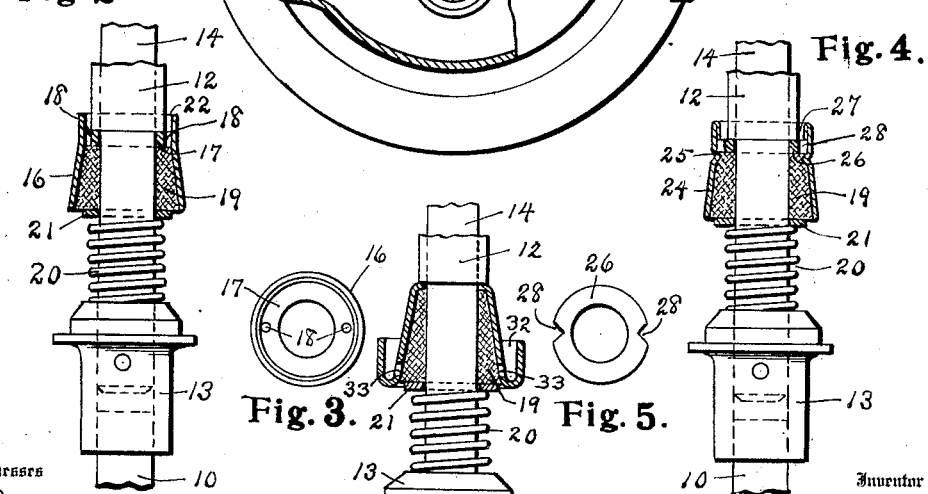
Fig. 2
Fig. 4.
Fig. 3.
Fig. 5.
Fig. 6.
Witnesses
O. B. Baenziger.
E. M. Brown.
Inventor
William E. Foltz.
By Edward N. Pagelsen.
Attorney

UNITED STATES PATENT OFFICE.

WILLIAM E. FOLTZ, OF DETROIT, MICHIGAN.

VALVE-STEM LUBRICATOR AND PACKING.

940,143.  Specification of Letters Patent.  Patented Nov. 16, 1909.

Application filed July 23, 1909. Serial No. 509,176.

*To all whom it may concern:*

Be it known that I, WILLIAM E. FOLTZ, a citizen of the United States, and a resident of Detroit, in the county of Wayne and State of Michigan, have invented a new and Improved Valve Stem Lubricator and Packing, of which the following is a specification.

This invention embodies a combined valve stem lubricator and packing, and its object is to provide means for preventing leakage around a longitudinally reciprocating sliding rod and for keeping its surface covered with a liquid lubricant.

In the accompanying drawings, Figure 1 is a view, partly in vertical cross section of an explosion engine having this improved lubricator and packing in combination with the inlet-valve stem. Fig. 2 is a view on a larger scale of the stem with the lubricator in cross section. Fig. 3 is a plan of the lubricator. Fig. 4 is a similar view of the stem and a modified form of the lubricator. Fig. 5 is a plan of a washer. Fig. 6 shows another modification.

Similar reference characters refer to like parts throughout the several views.

The present invention is adapted for use with any longitudinally slidable rod but is especially adapted for use with the inlet-valve stems of explosion engines, where it is often difficult, if not impossible, to lubricate the stem where it passes through the valve casing. When these stems become worn, a stream of air enters the explosion chamber with each suction stroke, thus preventing accurate control of the explosive mixture. The packing receptacle should be so constructed as to conform to the position taken by the stem after the bearing has become worn and the lubricating device for the stem should be so positioned that the proper effect will not be counteracted by the solvent properties of the gasolene.

In the accompanying drawings an explosion engine is shown consisting of a base 1, cylinder 2, piston 3, connecting rod 4, crank 5, valve chamber 6, cam-shaft 7, valve-cam 8, stem-guide 9, valve-stem 10 and spring 11, all of which form no part of this present invention.

Extending down from the valve chamber 6 is a sleeve 12 which forms a guide for the upper end of the valve stem. On the stem is a collar 13 which connects the lower portion of the stem 10 to the upper portion 14. This also furnishes a bearing for the lower end of the spring 11 which normally holds the valve 15 on its seat.

Slidable on the stem 14 is a small receptacle in the form of a tapering cup 16 having an inwardly extending flange 17 provided with holes 18 through which the lubricant may pass to the felt or other fibrous packing 19. A metal washer 21 is held against this packing by means of the spring 20 which rests on the collar 13. A cylindrical flange 22 at the upper end of the receptacle 16 above the flange 18 acts as an oil receiver.

The operation is as follows. The parts being in the position shown in Fig. 1, the spring 20 will press the washer 21 against the fibrous material, forcing it to close around the stem 14, and at the same time this pressure of the spring will force the flange 18 against the end of the sleeve 12, preventing leakage. Oil may be poured into the receiver formed by the flange 22 and will run down through the holes 18 into the felt or other material and cover the stem. It will crawl up between the stem and the sleeve 12, lubricating the bearing surfaces of both.

The pressure of the washer 21 on the fibrous material in the shell 16 will prevent leakage around the stem. The spring 20 must always be long enough to permit the valve 15 to seat without relieving the spring from all stress.

The construction described may be modified as desired without departing from the spirit of my invention. In Figs. 4 and 5 such a modification is shown, in which the sleeve 24 is spun out of a piece of tubing, the bead 25 on the inside being formed to support the washer 26, and one end of the tube is crimped in to hold the washer in position and to form the oil receptacle 27. The washer may be perforated in any desirable manner to permit the lubricant to flow through to reach the fibrous packing 19, Fig. 5 showing the washer formed with notches 28 for that purpose.

A second modification is shown in Fig. 6 in which the stem 14, sleeve 12, washer 21, spring 20, and collar 13 are the same as before described. The lubricating device is shown formed of thin metal and may be cast or spun. The body 30 tapers upward and an inwardly extending flange 31 at its upper end fits the stem 14 and contacts with the end of the sleeve 12 preventing leakage. The packing 19, preferably a gasket of felt, is forced into the tapering body and closes around the stem 14 and prevents leakage, at the same time lubricating the same. The lower end of the body curves up to form a circular lip 32 which will act as an oil cup, the oil passing in through the holes 33 saturates the packing 19.

It will be seen that these lubricating and packing devices may be used on revoluble as well as on slidable stems.

Having now explained my improvements, what I claim as my invention and desire to secure by Letters Patent is:—

1. A valve-stem lubricator and packing consisting of a tubular body independently mounted on the stem and having an inwardly extending perforated flange intermediate its ends, a fibrous packing within the body below the flange, and means to keep the packing under pressure.

2. A valve-stem lubricator and packing, consisting of a tubular body independently mounted on the stem and having an inwardly extending flange and an oil receptacle, and a fibrous packing within the body adapted to receive lubricating oil through openings in the body, and means to keep the packing under pressure.

3. A valve-stem lubricator and packing adapted to be mounted on a valve-stem below the bearing sleeve of the stem, and consisting of a tubular body having a perforated inwardly-extending flange intermediate its ends, the upper end of the body being of larger diameter than the bearing sleeve, the lower end of the body being tapering, a fibrous gasket within the body below the flange, a metal washer engaging the outer face of the gasket, and a spring mounted on the valve-stem engaging the washer to force the gasket into the tapering body and the flange against the end of the sleeve to prevent leakage around the stem.

4. A valve-stem lubricator and packing adapted to be mounted on the stem, consisting of a tubular body, a perforated flange intermediate the ends, the upper part of the body forming an oil receptacle, the lower part of the body tapering upward, a fibrous gasket within said tapering portion of the body, a washer mounted on the stem in engagement with the gasket, and a spring mounted on the stem in engagement with the washer.

In testimony whereof I have signed this specification in the presence of two subscribing witnesses.

WILLIAM E. FOLTZ.

Witnesses:
EDWARD N. PAGELSEN,
ELIZABETH M. BROWN.